(12) United States Patent
Peraza et al.

(10) Patent No.: US 9,195,637 B2
(45) Date of Patent: Nov. 24, 2015

(54) PROPORTIONAL FONT SCALING (75) Inventors: Jorge Peraza, Seattle, WA (US); Philip K. Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1090 days.

(21) Appl. No.: 12/939,061

(22) Filed: Nov. 3, 2010

(65) Prior Publication Data
US 2012/0110438 A1 May 3, 2012

(51) Int. Cl.
G06F 17/00 (2006.01)
G06F 17/21 (2006.01)
G06F 3/0485 (2013.01)

(52) U.S. Cl.
CPC ............ G06F 17/214 (2013.01); G06F 3/0485 (2013.01); *G06F 2203/04806* (2013.01)

(58) Field of Classification Search
CPC ..................... G06F 17/214; G06F 2203/04806
USPC ................... 715/238, 243–244, 252
See application file for complete search history.

(56) References Cited

U.S. PATENT DOCUMENTS

| | | |
|---|---|---|
| 5,398,306 A | 3/1995 | Karow |
| 5,577,170 A | 11/1996 | Karow |
| 5,724,596 A | 3/1998 | Lathrop |
| 5,754,873 A | 5/1998 | Nolan |
| 6,300,947 B1 | 10/2001 | Kanevsky |
| 6,456,305 B1* | 9/2002 | Qureshi et al. ............... 715/800 |
| 6,556,217 B1 | 4/2003 | Makipaa et al. |
| 6,857,102 B1 | 2/2005 | Bickmore et al. |
| 7,487,447 B1* | 2/2009 | Jerger ........................... 715/252 |
| 7,549,114 B2 | 6/2009 | Bederson et al. |
| 7,584,423 B2 | 9/2009 | Rohrabaugh et al. |
| 2003/0095135 A1* | 5/2003 | Kaasila et al. ............... 345/613 |
| 2005/0094207 A1* | 5/2005 | Lo et al. ...................... 358/1.18 |
| 2005/0162427 A1 | 7/2005 | Momozono et al. |
| 2006/0085743 A1* | 4/2006 | Baudisch et al. ............. 715/526 |
| 2007/0124669 A1* | 5/2007 | Makela ........................ 715/520 |
| 2010/0299395 A1* | 11/2010 | Klassen ....................... 709/206 |

OTHER PUBLICATIONS

Martin, "Scalable Fonts Reshape Type", retrieved on Aug. 10, 2010 at <<http://mobiledevdesign.com/tutorials/scalable_fonts_reshape_type-0120/index1.html>>, Penton Media, Mobile Dev and Design, Jan. 20, 2009, pp. 1-2.

* cited by examiner

*Primary Examiner* — Scott Baderman
*Assistant Examiner* — Howard Cortes
(74) *Attorney, Agent, or Firm* — Bryan Webster; Judy Yee; Micky Minhas (57) ABSTRACT

The font size of text included in web page content is proportionally scaled based on proportional container widths and/or a minimum readable font size. The proportional font scaling improves web content readability on small-screen devices while maintaining relative proportions of font sizes between text containers when the text containers are rendered at full display width.

18 Claims, 10 Drawing Sheets

PROPORTIONAL FONT SCALING

BACKGROUND

Many mobile devices now come equipped with Internet browsing capabilities. Most web sites are designed for rendering through a typical desktop or laptop computer system having an associated display. However, most mobile devices have a much smaller display than a typical desktop or laptop computing system. As a result, to render a web page on a mobile device, the web page is reduced in size so that it fits on the smaller display.

When the reduced web page is rendered on the smaller display, the text is typically too small to be readable by most users. The user then zooms in on an area of the web page to be able to read the text. As a result of the zooming, the area of text that the user wants to read typically extends beyond the boundaries of the display, requiring the user to scroll in one or both of the horizontal or vertical directions. Vertical scrolling is common while viewing web pages, even on the larger desktop or laptop displays. Horizontal scrolling, however, may be found in some contexts to negatively impact user experience.

SUMMARY

This document describes proportional font scaling. In one aspect, fonts are proportionally scaled for rendering on a small-screen device based on a minimum readable font size. In another aspect, fonts associated with text containers are proportionally scaled for rendering on a small-screen device based on relative container widths. In another aspect, fonts are proportionally scaled based on a combination of relative container widths and a minimum readable font size. Fonts are scaled to maintain original font proportions between text containers of different widths when the containers are rendered at a common display width.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Proportional font scaling is a technique by which data is modified to be rendered on a device with a relatively small display (e.g., a mobile phone as compared to a desktop computer system with a full-size monitor). Many mobile devices include access to a wide variety of information, for example, over the Internet. While the display resolution (e.g., pixel density) of many of these mobile devices is high enough to enable rendering a complete web page, to fit a particular web page on the mobile device display, the web page content is frequently reduced in size to a point that the text is no longer readable to the unaided human eye.

Most mobile browser applications include functionality that enables a user to zoom in to a specific area of text on a web page, which effectively increases the font size of the text being rendered. However, in many instances, after zooming in enough to make the text a readable size, the text will extend beyond the boundaries of the mobile device display, forcing the user to scroll both vertically and horizontally in order to see the complete text. While vertical scrolling is very common and expected by users, horizontal scrolling can be cumbersome and may negatively affect user experience.

In an effort to minimize the horizontal scrolling, most mobile browser applications include functionality that enables a user to enter a command (e.g., a double-tap on a touch-screen) to automatically zoom a particular area of a web page to the full width of the display. However, as described above, the resulting zoom level may not result in readable text. One option for handling this situation is to determine the font size of the text that will be rendered if such a zoom command is performed, and if the font size will be less than a minimum font size to ensure readability, automatically increase the font size.

For example, assume a web page includes two areas of text, one with a small font size, and one with a large font size, the large font being two times the size of the small font (e.g., the small font is 10 pt. and the large font is 20 pt.). Further, assume a minimum font size of 24 pixels, where a "pixel" is defined based on a logical pixel density associated with a particular display. If a user were to double-tap on the particular area of the web page that includes the large-size font, that area of text would be zoomed to fill the width of the display. Depending on the width of the area that contains the text, the text may be rendered, for example, at a size of 28 pixels. In this scenario, because a font size of 28 pixels is larger than the minimum font size of 24 pixels, no adjustment is made to the size of the text. However, if the user were to double-tap on the particular area of the web page that includes the small-size font, that area of text would be zoomed to fill the width of the display. Assuming the text areas on the web page are equal in width, when the second area is zoomed to fit the display, the text will be rendered to have a font size of 14 pixels. Because the font size to be rendered (14 pixels) is less than the minimum font size (24 pixels), the font size of the text may be increased so that, when rendered to fill the width of the display, the text will have a font size of at least 24 pixels.

This example illustrates one way in which a minimum readable font size may be used to ensure that rendered text is readable on a mobile device display. However, the example given above also illustrates a drawback to this approach. That is, the proportional difference between the two font sizes is lost. In the described example, the original font sizes are 10 pt. and 20 pt., meaning that the large font is twice the size if the small font. However, when the text is eventually rendered according to the technique described above, the small font is rendered at a font size of 24 pixels and the large font is rendered at a font size of 28 pixels. Because the size difference between 24 pixels and 28 pixels is not as significant as the size difference between 10 pt. and 20 pt., the proportional difference between the two font sizes is lost.

Proportional font scaling is a technique for modifying the font size of web page content to be rendered on a small-screen device while maintaining the original font size proportions in the resulting small-screen device display of the web page content.

Example Environment

Figure 1:
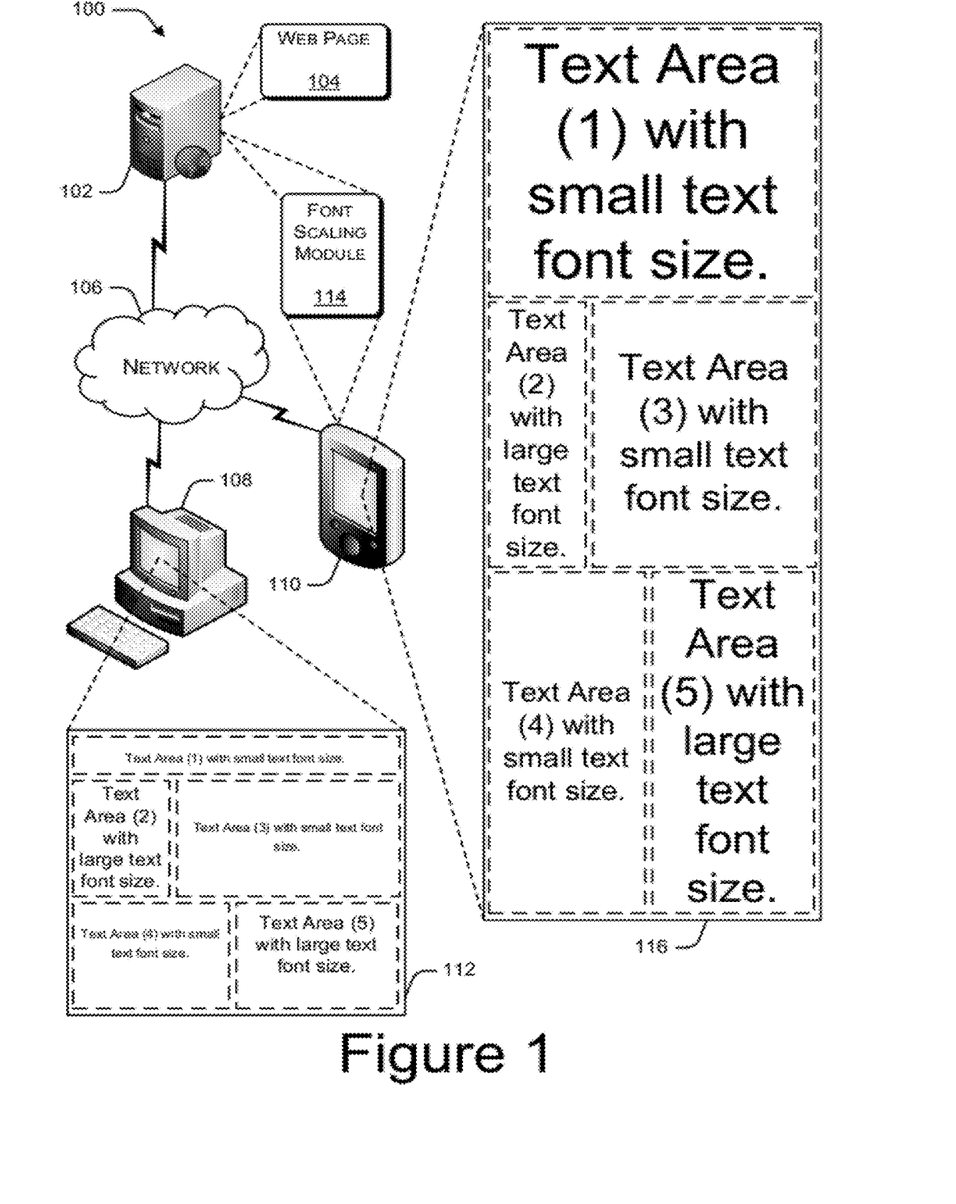
FIG. 1 is a pictorial diagram of an example environment in which proportional font scaling may be implemented.

FIG. 1 illustrates an example environment 100 usable to implement proportional font scaling. Example environment 100 includes a web server 102 that serves a web page 104 over a network 106. Network 106 is representative of, for example, the Internet.

Various types of network capable devices are configured to access the web page 104 over the network 106. For example, a large-screen device 108 and a small-screen device 110 may each be configured to enable access to web page 104. Desktop computer system 108 is representative of any large-screen device, including, but not limited to, a desktop computer system, a laptop computer system, television system, a gaming system, and so on. Most websites are typically optimized for displays that are relatively large, having, for example, a diagonal measurement of at least 12 inches. Accordingly, large-screen device 108 may be representative of any device having a display that is relatively large. Alternatively, large-screen device 108 may be representative of any device having a display size that, for any particular web content, results in a readable-sized rendering of the particular web content as designed. Small-screen device 110 is representative of any type of network accessible small-screen device, including, but not limited to, a mobile phone, a personal digital assistant (PDA), a netbook, a handheld computer, and so on. Many small-screen devices support WVGA (wide video graphics array) and HVGA (half-size video graphics array) resolutions and have displays with smaller diagonal measurements. Accordingly, small-screen device 110 may be representative of any device having a display that has a diagonal measurement of less than 12 inches. Alternatively, small-screen device 110 may represent any device having a display size that, for any particular web content, results in a smaller-than-readable-sized rendering of the particular web content as designed.

In the illustrated example, when a large-screen device 108 receives web page 104, the web page content is rendered in accordance with design parameters of the web page, without modification. An example rendering of web page 104 on a large-screen device is illustrated in FIG. 1 as large-screen display 112.

Large-screen display 112 illustrates that example web page 104 includes five distinct text areas, each delineated by a dashed outline. These areas are known as containers, and are defined areas of the web page for holding text. Web pages may also include other types of containers that include, for example, image containers, video containers, or other containers. A container may also be defined to include a particular type of content and one or more other containers. For example, a text container may include text and an image container to render an associated image. For simplicity, the illustrated example web page 104 includes five containers, each for rendering text. As illustrated, the containers on a web page have various positions and sizes, and the text in each container has a particular font size.

There are several attributes of example web page 104 that affect proportional font scaling. These include the proportional sizes of the fonts, and the proportional widths of each container. As illustrated, the text containers of web page 104 are designed such that Text Area (1), Text Area (3), and Text Area (4) each have the same, smaller font size, and Text Area (2) and Text Area (5) have the same, but larger font size. Furthermore, Text Area (1) has a container that is the full width of the web page, Text Area (2) has a container that is one-third the width of the web page, Text Area (3) has a container that is two-thirds the width of the web page, Text Area (4) has a container that is one-half the width of the web page, and Text Area (5) has a container that is one-half the width of the web page.

When small-screen device 110 accesses web page 104, font scaling module 114 processes the content of web page 104 to perform proportional font scaling. As illustrated in FIG. 1, font scaling module 114 may be implemented as a component of small-screen device 110 or as a component of web server 102. Alternatively, font scaling module 114, or portions thereof, may be implemented by any intermediate device between web server 102 and small-screen device 110, such as a proxy server.

Small-screen display 116 illustrates rendered content of web page 104 after proportional font scaling has been applied to modify the content for rendering on small-screen device 110. Several characteristics of small-screen display 116 are the same as corresponding characteristics of large-screen display 112. For example, the width of the web page is the same between the two displays, and the widths and relative positions of the containers is the same between the two displays. Furthermore, the content of each container is the same between the two displays.

The difference between the two displays is the font sizes of the text in the various containers. For small-screen display 116, the size of the font in each container has been modified based, at least in part, on characteristics of the original web page design including relative container widths and relative font sizes, as will be discussed in further detail below.

Figure 2:
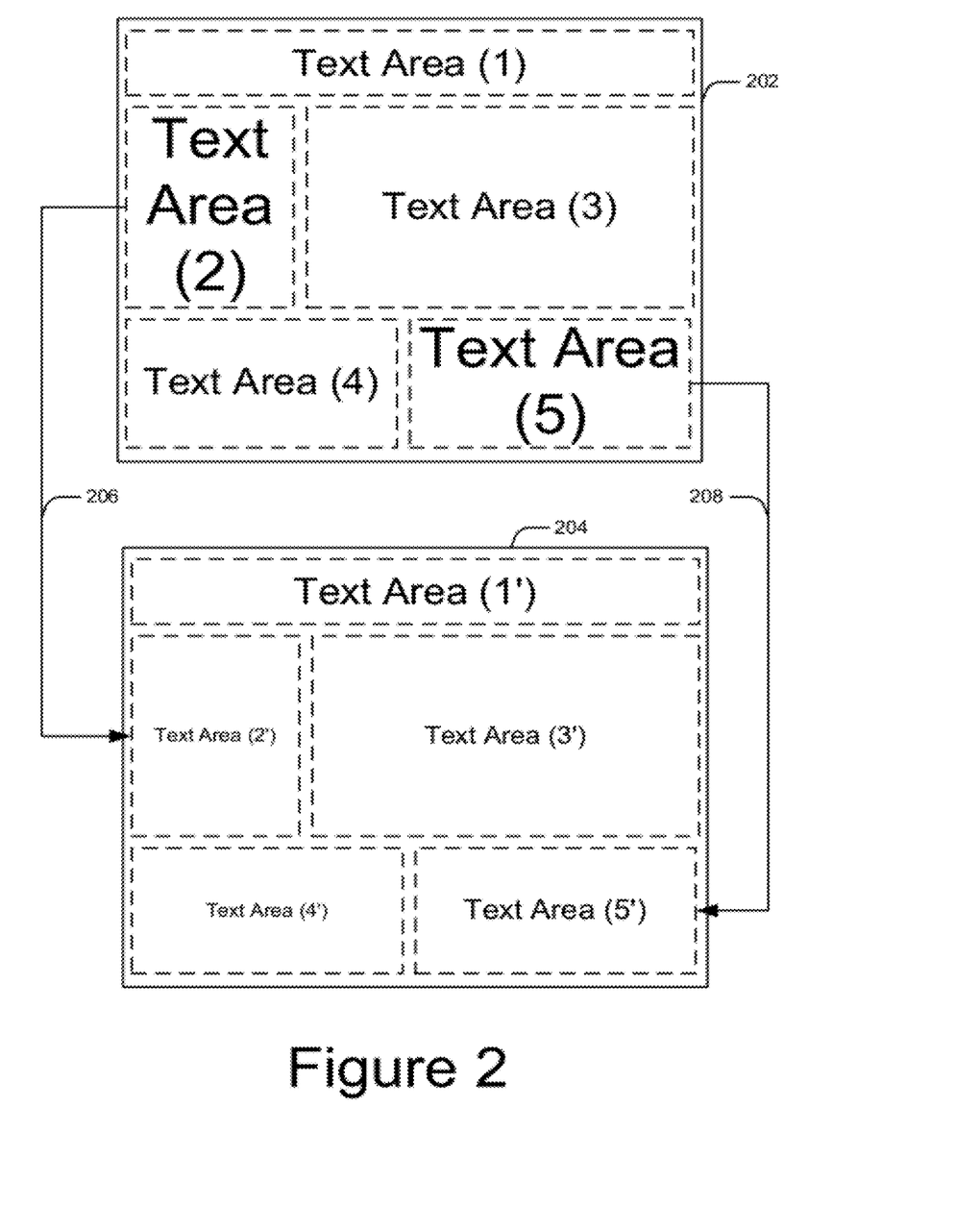
FIG. 2 is a pictorial diagram that illustrates example proportional font scaling based on container width.

As mentioned above, proportional font scaling may be based on multiple web page attributes including, for example, proportional sizes of the fonts and proportional widths of each container. FIG. 2 illustrates an example of proportional font scaling based on relative container widths. Large-screen display 202 is representative of a web page rendered according to original web page layout parameters, similar to large-screen display 112 shown in FIG. 1. Small-screen display 204 is representative of the same web page rendered after proportional font scaling based on relative container widths has been applied.

In the illustrated example, the web page includes five text containers, represented in large-screen display 202 as Text Area (1), Text Area (2), Text Area (3), Text Area (4), and Text Area (5). Text Area (1) is in a container that is the full width of the web page and has a font size of 24 pt.; Text Area (2) is in a container that is one-third the width of the web page, and has a font size of 36 pt.; Text Area (3) is in a container that is two-thirds the width of the web page, and has a font size of 24 pt.; Text Area (4) is in a container that is one-half the width of the web page, and has a font size of 24 pt.; and Text Area (5) is in a container that is one-half the width of the web page, and has a font size of 36 pt.

Small-screen display 204 includes corresponding text areas that include the same content, but in which the font sizes have been adjusted based on relative container widths. For example, as designated by arrow 206, Text Area (2) in large-screen display 202 corresponds to Text Area (2') in small-screen display 204; as designated by arrow 208, Text Area (5) in large-screen display 202 corresponds to Text Area (5') in small-screen display 204; and so on.

In the illustrated example, the font size of the contents of each container has been adjusted between large-screen display 202 and small-screen display 204, based on relative widths of the containers. The purpose of this font scaling is to maintain the original proportions between the fonts when the web page is rendered on a small display and the user double-taps a particular container, for example, to render the particular container at the full display width. For example, looking first at large-screen display 202, the text in the container labeled Text Area (2) is 1.5 times larger than the text in the container labeled Text Area (1). Accordingly, when a user views the web page on small-screen display 204, and double taps the container associated with Text Area (2'), the text size should be 1.5 times larger than the text rendered when the user double tabs the container associated with Text Area (1').

Therefore, in the illustrated example, the font sizes are adjusted as follows. Because Text Area (1) and Text Area (1') are the full width of the web page, no adjustment is made to the size of the font in Text Area (1'). That is, when the user double-taps Text Area (1') to render that container at full display width, the font size will be 24 pt.

Text Area (2) and Text Area (2') are defined to be one-third the width of the web page. Accordingly, to render Text Area (2') at full display width in response to a double-tap command, a 3× zoom will be applied. Accordingly, the font of the text in Text Area (2') is scaled to one-third of the original size, so that after the 3× zoom is applied, the text will appear at its original size. The original size in this example was 36 pt (in Text Area (2)), so the font size in Text Area (2') is 12 pt.

Text Area (3) and Text Area (3') are defined to be two-thirds the width of the web page. Accordingly, to render Text Area (3') at full display width in response to a double-tap command, a zoom of 3/2 will be applied. Accordingly, the font of the text in Text Area (3') is scaled to two-thirds of the original size. The original size in this example was 24 pt (in Text Area (3)), so the font size in Text Area (3') is 16 pt.

Text Area (4), Text Area (4'), Text Area (5), and Text Area (5') are each defined to be one-half the width of the web page. Following the logic outlined above, the font in Text Area (4') and the font in Text Area (5') is one-half the size of the font in Text Area (4) and the font in Text Area (5), respectively.

FIG. 2 provides a simplistic example that illustrates scaling font size based solely on relative container widths. The described scaling provides a mechanism for maintaining font proportions when utilizing the double-tap mobile browser functionality. However, because of the small display size, even when zoomed to fill the full width of the display, oftentimes, text containers are still subject to an optical zoom, which makes the text appear smaller than it would typically appear on a large-screen display. For example, if the web page shown in FIG. 2 is designed for a large-screen display 202, the font size of the text in Text Area (1) will be 24 pt. when rendered on large-screen display 202. If the small-screen display 204 is one-fourth the width of large-screen display 202, then a 0.25 optical zoom is applied when the web page is rendered, so the 24 pt. font in Text Area (1') will appear to be only 6 pt. As such, proportional font scaling based solely on relative container width is often not sufficient to provide a user with consistently readable font sizes. Accordingly, additional font scaling based on a minimum readable font size is used to further enhance the user's experience.

Figure 3:
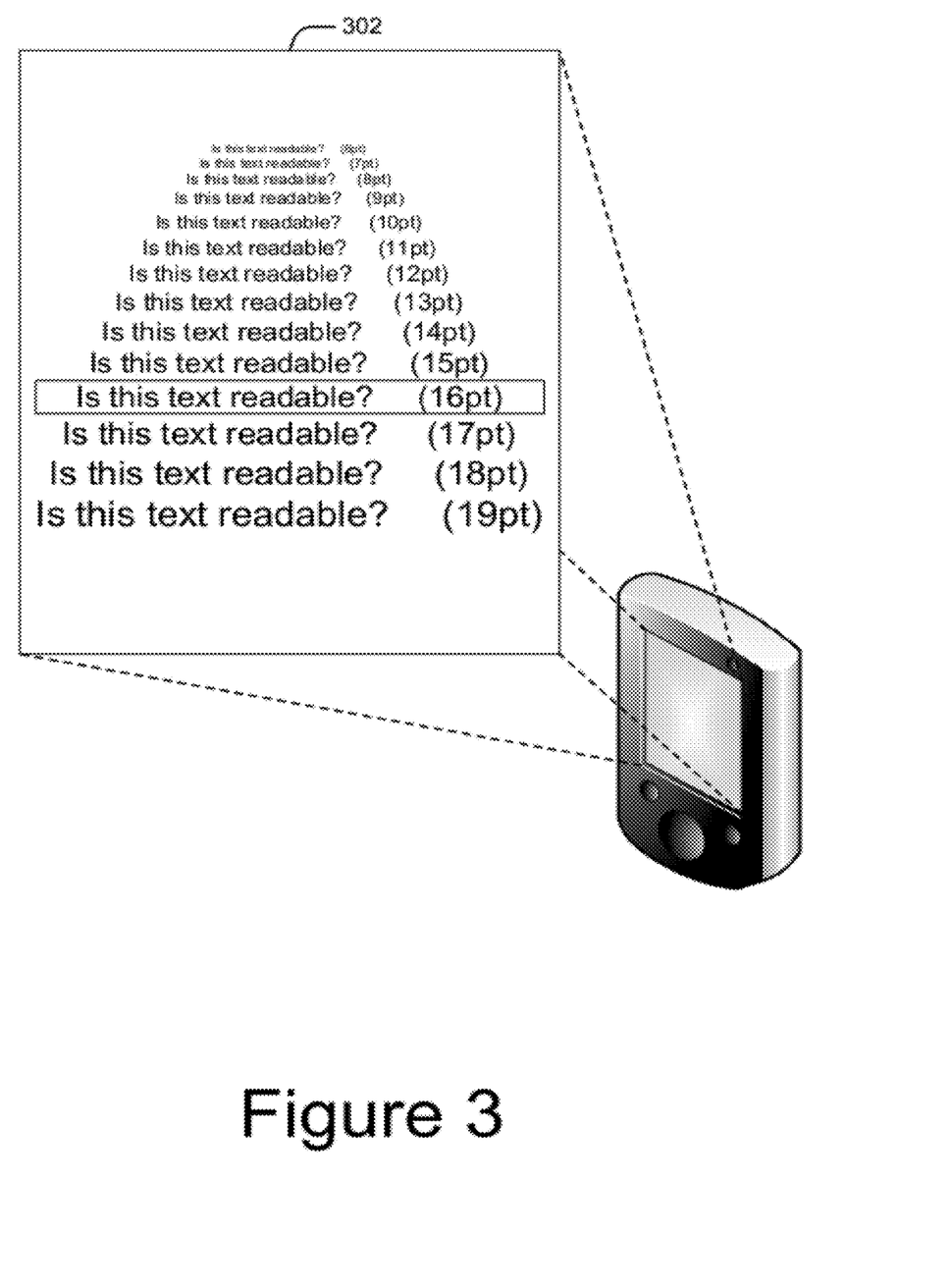
FIG. 3 is a pictorial diagram of an example user interface for selecting a minimum readable font size.

In the described implementation, font scaling is performed using calculations that are based, in part, on a defined minimum readable font size and a normalization value. FIG. 3 illustrates an example indication of a minimum readable font size for a particular small-screen device. In an example implementation, the minimum readable font size is user-defined through a user interface 302, enabling each user to custom-select a minimum readable font size that is most comfortable for them, personally, on any particular small-screen device. Accordingly, a user with very good eyesight may choose a minimum readable font size of for example, 9 pt., while another user with poorer eyesight may choose a minimum readable font size of, for example, 16 pt., as illustrated in FIG. 3. In an alternate implementation, the minimum readable font size may be pre-defined for a particular device and/or for a particular browser application installed on a particular device.

As mentioned above, in addition to a minimum readable font size, the font scaling calculations described herein also rely on a normalization value. Browser applications typically include a text size selection functionality that enables a user to dynamically adjust the size of text when a web page is rendered. The default size is typically labeled "medium," with larger and smaller sizes also available. User selection of a non-default text size through the web browser application does not modify the design parameters of a web page, but rather, dynamically modifies how the web page is rendered. Because the "medium" text size is typically the default used by a browser application when rendering a web page, the "medium" text size of a particular browser application can be used in proportional font scaling calculations as a normalization value. In alternate implementations, any value may be predefined as the normalization value. However, in the examples described herein, the normalization value is selected to be the browser application's "medium" text size.

Figure 4:
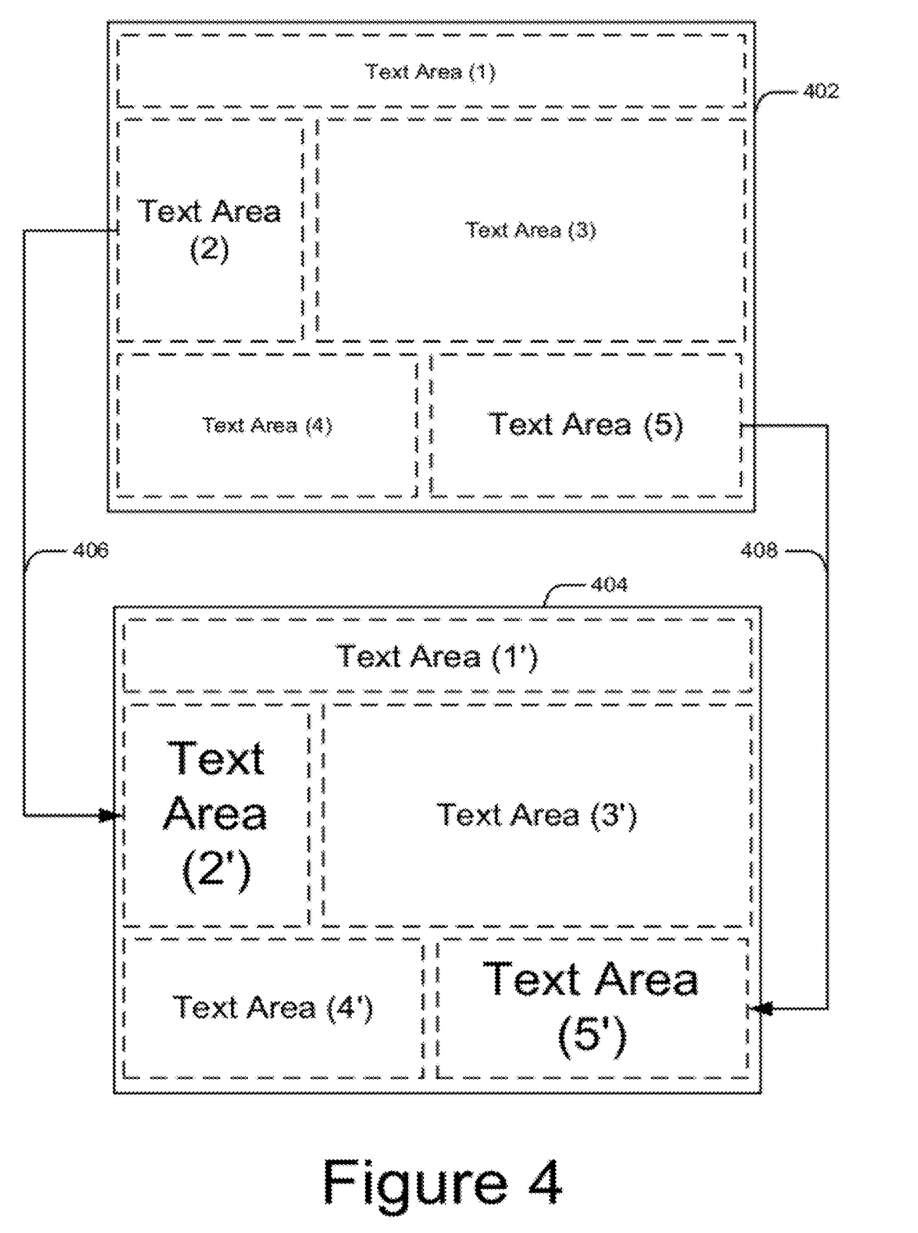
FIG. 4 is a pictorial diagram that illustrates example proportional font scaling based on a minimum readable font size.

FIG. 4 illustrates an example of relative font scaling based on a minimum readable font size. Large-screen display 402 is representative of a web page rendered according to original web page layout parameters, similar to large-screen display 112 shown in FIG. 1. Small-screen display 404 is representative of the same web page rendered after proportional font scaling based on a minimum readable font size has been applied. As designated by representative arrows 406 and 408, text areas shown on small-screen display 404 correspond to text areas shown on large-screen display 402.

In this example, a ratio of the minimum readable font size to the normalization value (e.g., the "medium" font size) is used as a factor for adjusting the size of each font on the web page. For example, assume a "medium" font size of 12 pt. and a minimum readable font size of 18 pt. Accordingly, the ratio of the minimum readable font size to the medium font size is (18/12=3/2).

Relative font scaling based on this ratio is illustrated in FIG. 4. For example, Text Area (1), Text Area (3), and Text Area (4), shown on large-screen display 402, each has a font size of 12 pt. Corresponding Text Area (1'), Text Area (3'), and Text Area (4'), shown on small-screen display 404, each has a font size of 18 pt. (i.e., 12*3/2=18). Similarly, Text Area (2)

and Text Area (5) each has a font size of 18 pt. and corresponding Text Area (2') and Text Area (5') each has a font size of 27 pt. (i.e., 18*3/2=27).

Combining the concepts of font scaling based on relative container width and font scaling based on a minimum readable font size and a browser default "medium" text size (e.g., a normalization value), an algorithm for calculating a new font size for a particular web page text container to be rendered on a small display is defined as:

$$NewFontSize = OriginalFontSize \times \left(\frac{MinReadableFontSize}{MediumFontSize}\right) \times \left(\frac{ContainerWidth}{ScreenWidth}\right)$$

where, at a minimum, MediumFontSize and MinReadableFontSize are expressed in the same units of measurement (e.g., pixels, points, twips, etc.), and Screen Width and ContainerWidth are expressed in the same units of measurement (e.g., pixels, inches, centimeters, etc.). NewFontSize will then be expressed in the same units as the OriginalFontSize.

Figure 5:
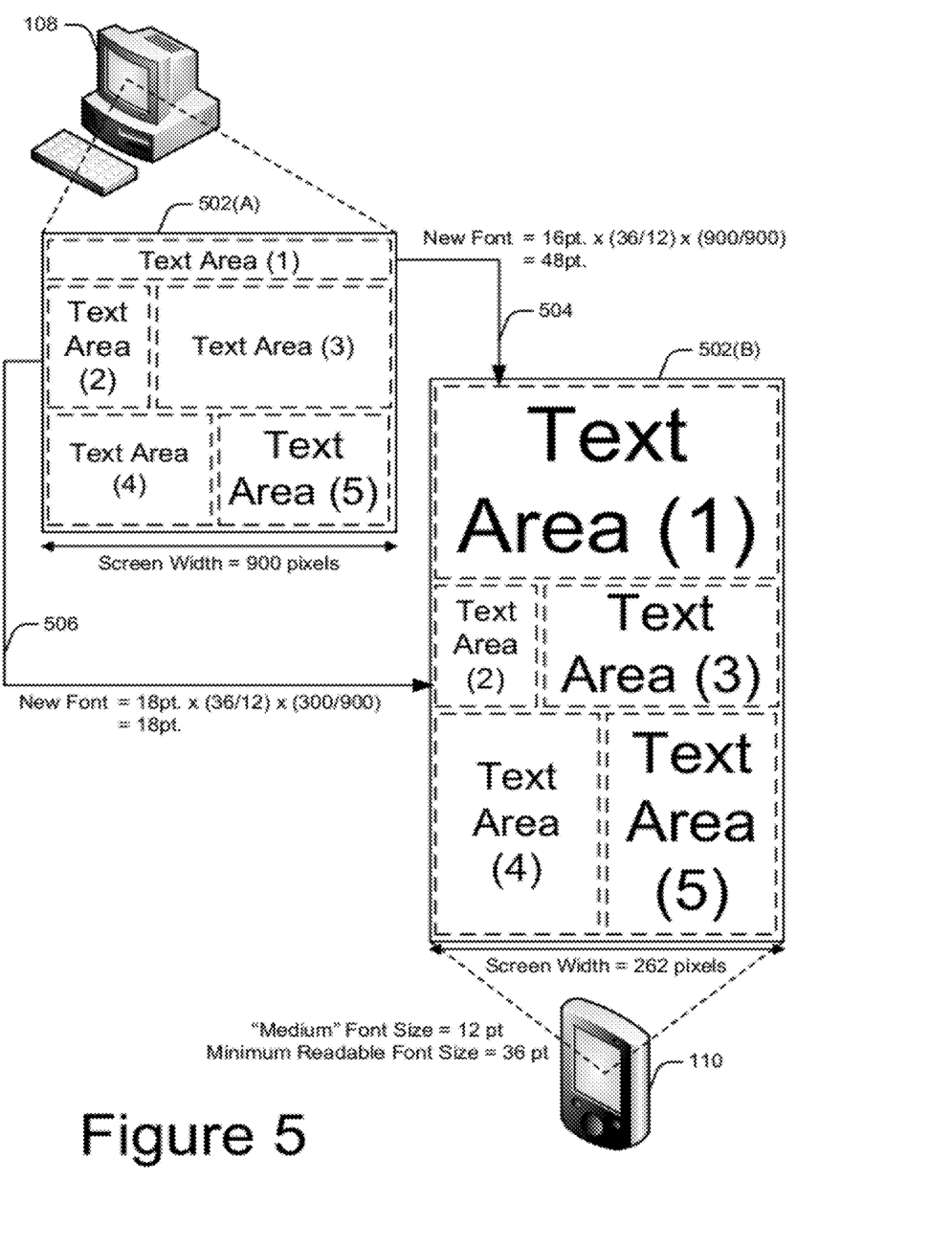
FIG. 5 is a pictorial diagram that illustrates example proportional font scaling based on container width and a minimum readable font size.

FIG. 5 illustrates example font scaling based on relative container widths and relative font sizes according to the algorithm defined above. In the illustrated example, a web page 502 is shown, originally designed for rendering on an example large-screen device 108 having a display width of 900 pixels. Web page display 502(A) represents the web page 502 as originally designed, and rendered on large-screen device 108. Web page display 502(B) represents the web page 502 modified for rendering on an example small-screen device 110 having a smaller display width (e.g., 262 pixels).

In the illustrated example, small-screen device 110 includes a browser application that has a pre-defined "medium" font size of 12 pt. Small-screen device 110 also has a minimum readable font size of 36 pt. As discussed above, the minimum readable font size may be pre-defined for the device or the browser, or may be a user-configured value.

Arrow 504 indicates that Text Area (1) in web page display 502(A) corresponds to Text Area (1) in web page display 502(B). The text next to arrow 504 indicates an example calculation used to determine the font size of Text Area (1) in web page display 502(B). Similarly, arrow 506 indicates that Text Area (2) in web page display 502(A) corresponds to Text Area (2) in web page display 502(B). The text next to arrow 506 indicates an example calculation used to determine the font size of Text Area (2) in web page display 502(B)

The parameters for calculating the font sizes for web page display 502(B) are shown below in Table 1.

TABLE 1

| Text Area | Original Font Size | Min. Readable Font Size | Medium Font Size | Container Width | Screen Width |
|---|---|---|---|---|---|
| 1 | 16 pt | 36 pt | 12 pt | 900 px | 900 px |
| 2 | 18 pt | 36 pt | 12 pt | 300 px | 900 px |
| 3 | 16 pt | 36 pt | 12 pt | 600 px | 900 px |
| 4 | 16 pt | 36 pt | 12 pt | 450 px | 900 px |
| 5 | 24 pt | 36 pt | 12 pt | 450 px | 900 px |

The calculations for determining the font sizes for web page display 502(B) are shown below in Table 2.

TABLE 2

| Text Area | Calculation | New Font Size |
|---|---|---|
| 1 | 16 pt * (36 pt/12 pt) * (900 px/900 px) | 48 pt |
| 2 | 18 pt * (36 pt/12 pt) * (300 px/900 px) | 18 pt |
| 3 | 16 pt * (36 pt/12 pt) * (600 px/900 px) | 32 pt |
| 4 | 16 pt * (36 pt/12 pt) * (450 px/900 px) | 24 pt |
| 5 | 24 pt * (36 pt/12 pt) * (450 px/900 px) | 36 pt |

Figure 6:
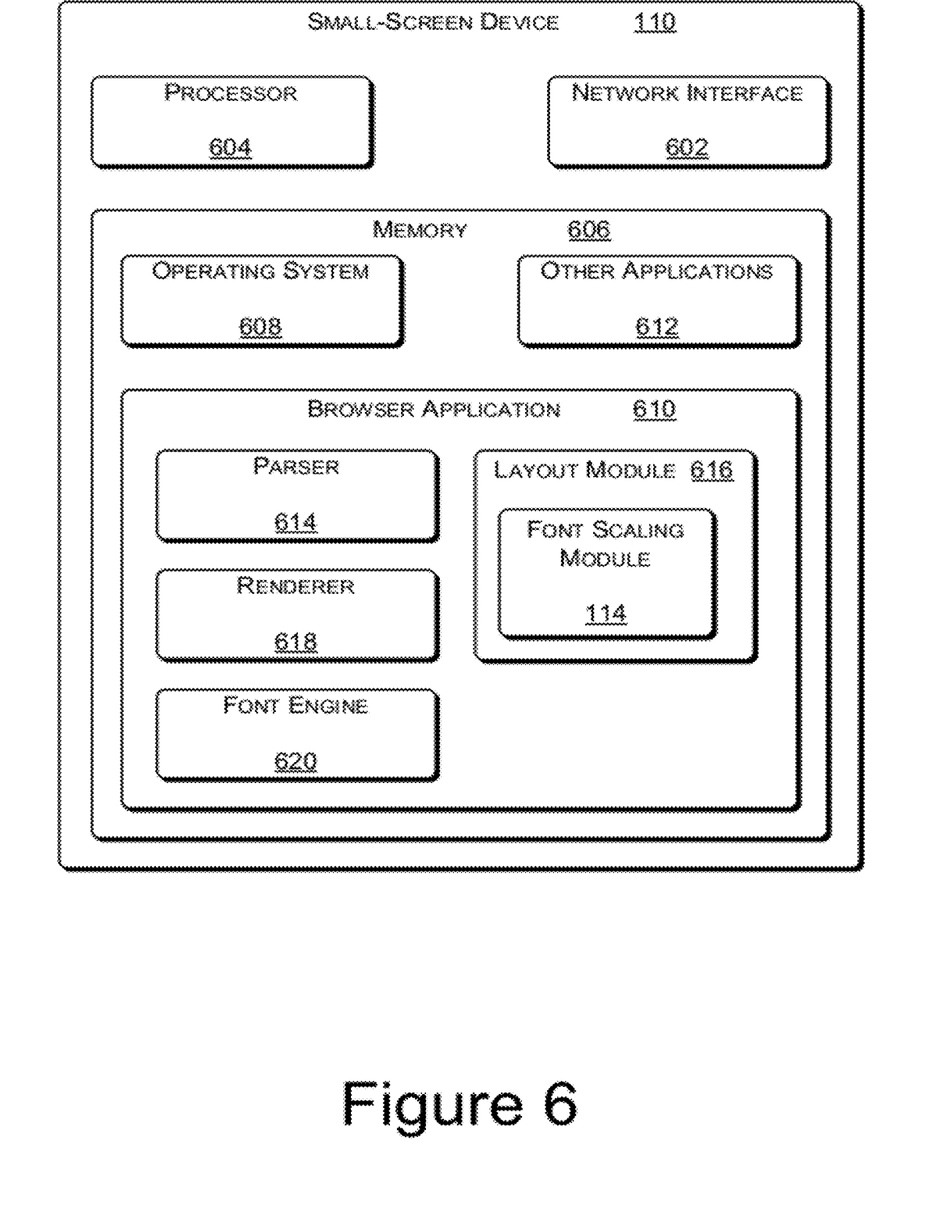
FIG. 6 is a block diagram that illustrates components of an example small-screen device configured to implement proportional font scaling.

FIG. 6 illustrates components of an example small-screen device 110. As described above, small-screen device 110 represents any type of device that includes a display that is smaller than a display for which a web page was designed. Example small-screen device 110 includes one or more network interfaces 602, processor 604, and memory 606. Network interface 602 enables small-screen device 110 to communicate with other devices over a network.

An operating system 608, a browser application 610, and one or more other applications 612 are stored in memory 606 as computer-readable instructions, and are executed, at least in part, on processor 604.

Browser application 610 includes a parser 614, a layout module 616, a renderer 618, and a font engine 620. Parser 614 receives web page content (e.g., HTML or other markup language content), and parses the content to identify various components of the web page (e.g., various containers of information). Layout module 616 analyzes the parsed web page content and determines the height and position of each component of the web page. Renderer 618 processes the content of the web page and the layout information generated by the layout module 616 to render the web page content for display. Font engine 620 is accessed by the renderer 618 to generate displayable text according to the web page content (e.g., font type and font size specifications found in the web page content).

In the illustrated example, layout module 616 includes font scaling module 114, which performs proportional font scaling as described herein, as part of the analysis of the parsed web page content that is performed by the layout module. HTML, as an example, enables web page developers to define web page elements (e.g., containers) to have absolute or relative positions and heights. The layout module 616 analyzes the web page content and determines actual heights and positions of each web page element, which are then used by the renderer to draw the web page content to the display. The font scaling module 114 is implemented as part of the layout module 616 because the proportional font scaling that is to be performed may alter the height and/or position of one or more web page elements. For example, referring back to the example shown in FIG. 5, because the size of the font used in Text Area (1) is significantly larger in web page display 502(B) than in web page display 502(A), the actual position of the container for Text Area (2) (and the other text area containers) is further down the page in web page display 502(B) than it is in web page display 502(A). By performing the proportional font scaling as part of the layout module analysis, the layout that is generated accurately accounts for the modified font sizes.

Although illustrated in FIG. 6 as being stored in memory 606 of small-screen device 110, browser application 610 and/or layout module 616 and/or font scaling module 222, or portions thereof, may be implemented using any form of computer-readable media that is accessible by small-screen device 110. Additionally, in alternate implementations, one or more components of operating system 608, browser application 610, and other applications 612 may be implemented as part of an integrated circuit that is part of, or accessible to, small-screen device 110. Furthermore, in alternate implementations, one or more components of browser application 610 and/or layout module 616 and/or font scaling module 222, or portions thereof, may be implemented as part of web server 102, or as part of any other device that may be implemented along a pathway between web server 102 and small-screen device 110.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

FIGS. 7-10 illustrate example processes for receiving and rendering web page content using proportional font scaling as described herein. The processes are illustrated as collections of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the illustrated processes, or alternate processes. Additionally, individual blocks may be deleted from the processes without departing from the spirit and scope of the subject matter described herein. Furthermore, while these processes are described with reference to the small-screen device 110 described above with reference to FIGS. 1 and 6, other computer architectures may implement one or more portions of this process, in whole or in part.

Figure 7:
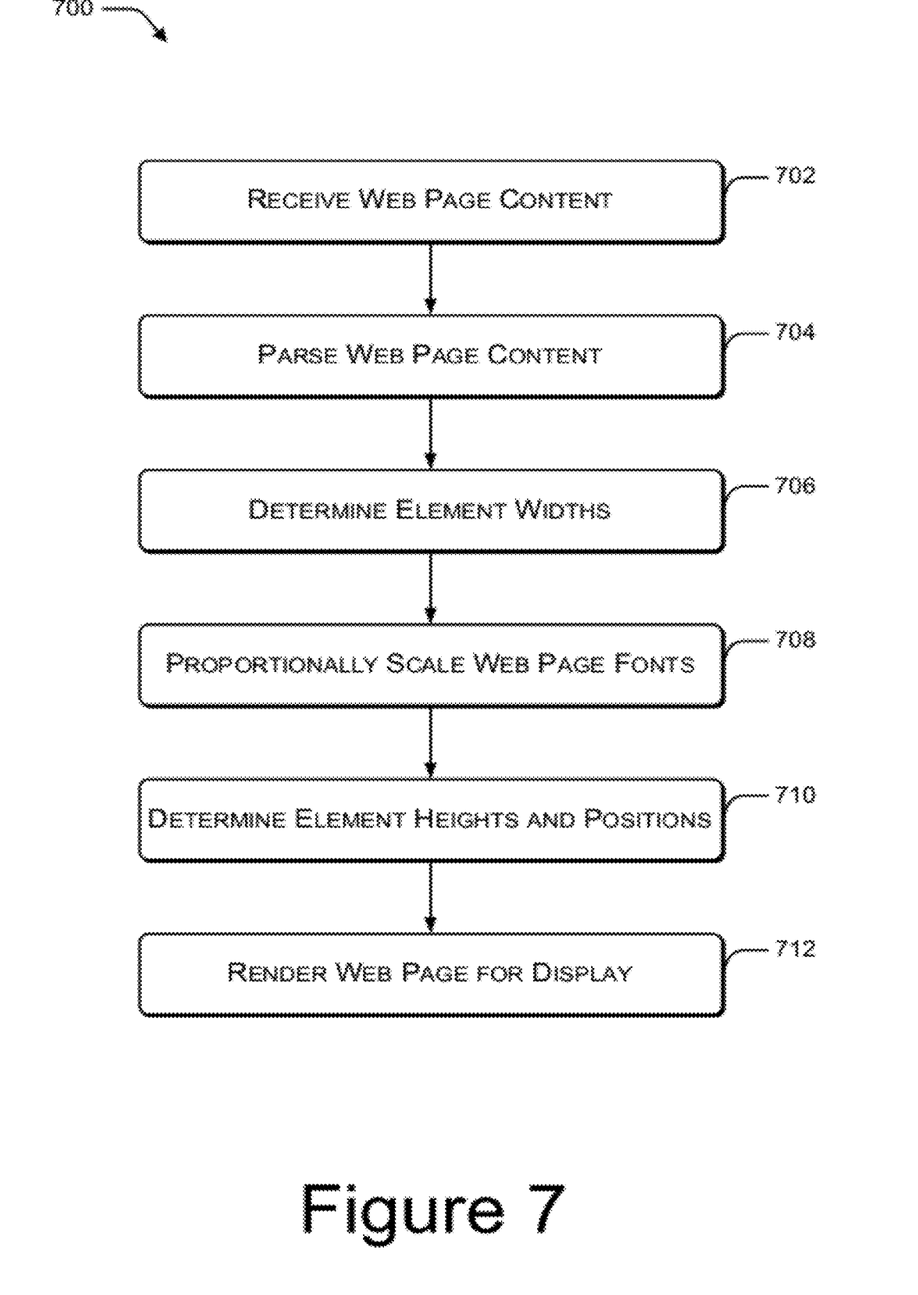
FIG. 7 is a flow diagram of an example process for rendering web content using proportional font scaling.

At block 702, web page content is received. For example, as illustrated in FIG. 1, small-screen device 110 receives web page 104 over network 106.

At block 704, the received web page content is parsed. For example, browser application 610 may receive the web page content in the form of HTML content. Parser 614 then parses the tags of the HTML content to identify various elements of the web page content (e.g., containers of text, images, or other types of content).

At block 706, the web page element widths are determined. For Example, parser 614 passes its results to layout module 616, which analyzes the web page content that has been parsed, and determines the width of each container.

At block 708, the web page fonts are proportionally scaled. For example, as part of layout module 616, font scaling module 114 calculates new font sizes for web page elements that contain text. An example process for proportionally scaling the font sizes is described in further detail below with reference to FIG. 8.

At block 710, positions and heights are determined for the web page elements. For example, layout module 616 of browser application 610, analyzes the web page content that has been parsed and proportionally scaled, to determine heights and positions for each container of data that is to be rendered as part of the web page.

At block 712, the web page is rendered for display. For example, renderer 618, in conjunction with font engine 620, draws the web page content to a display associated with small-screen device 110.

Figure 8:
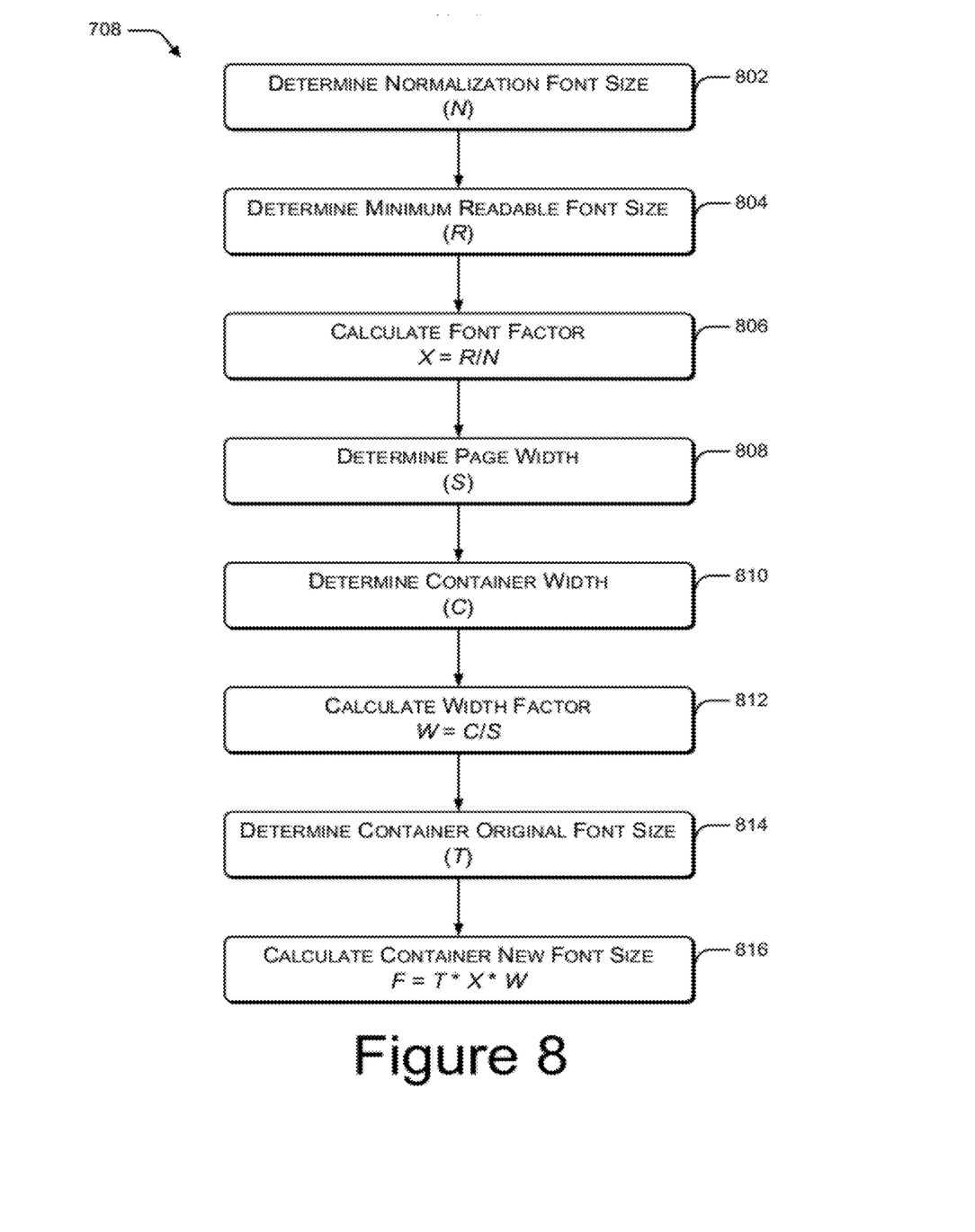
FIG. 8 is a flow diagram that illustrates an example process for proportionally scaling fonts based on a minimum readable font size and a container width.
Figure 9:
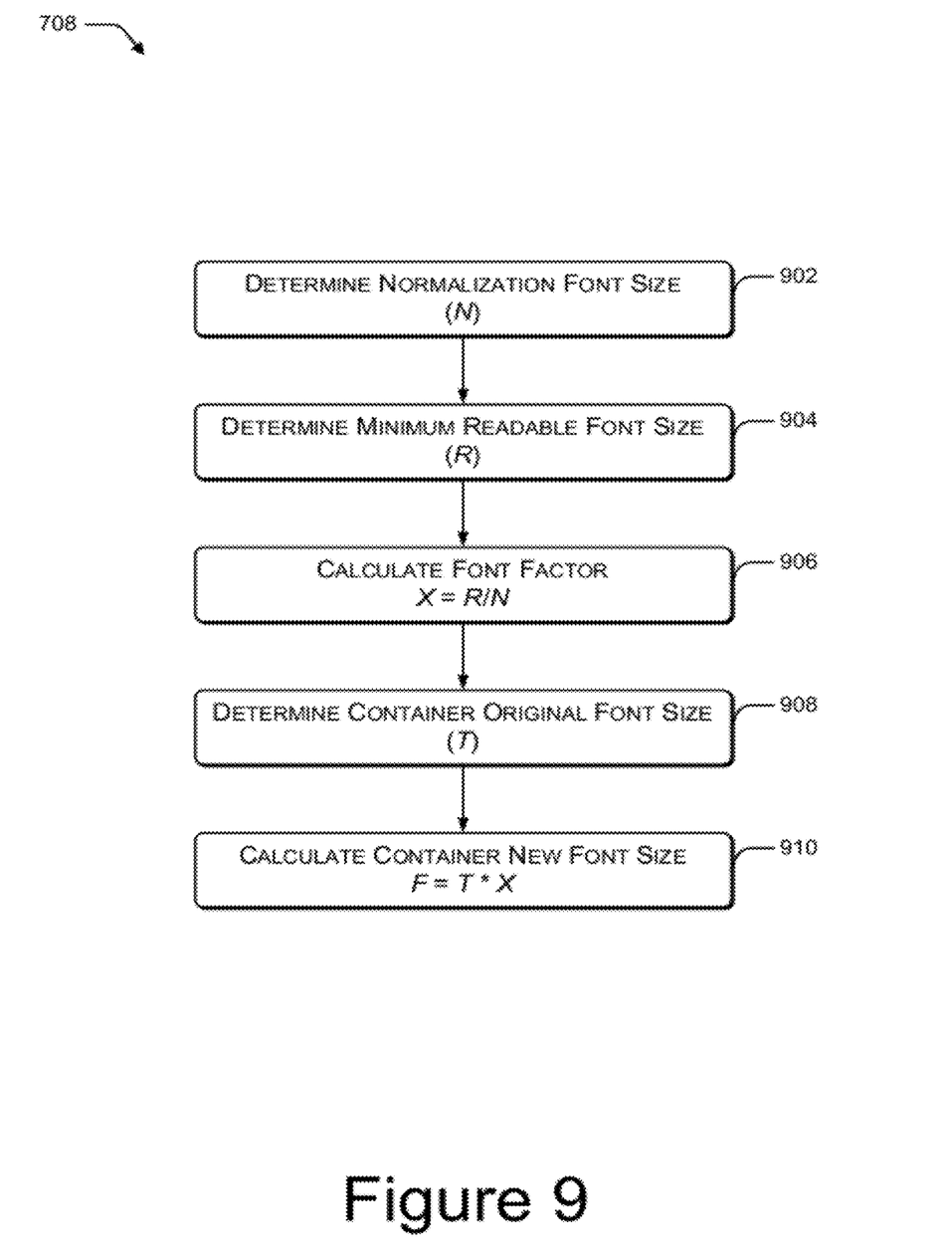
FIG. 9 is a flow diagram that illustrates an example process for proportionally scaling fonts based on a minimum readable font size.
Figure 10:
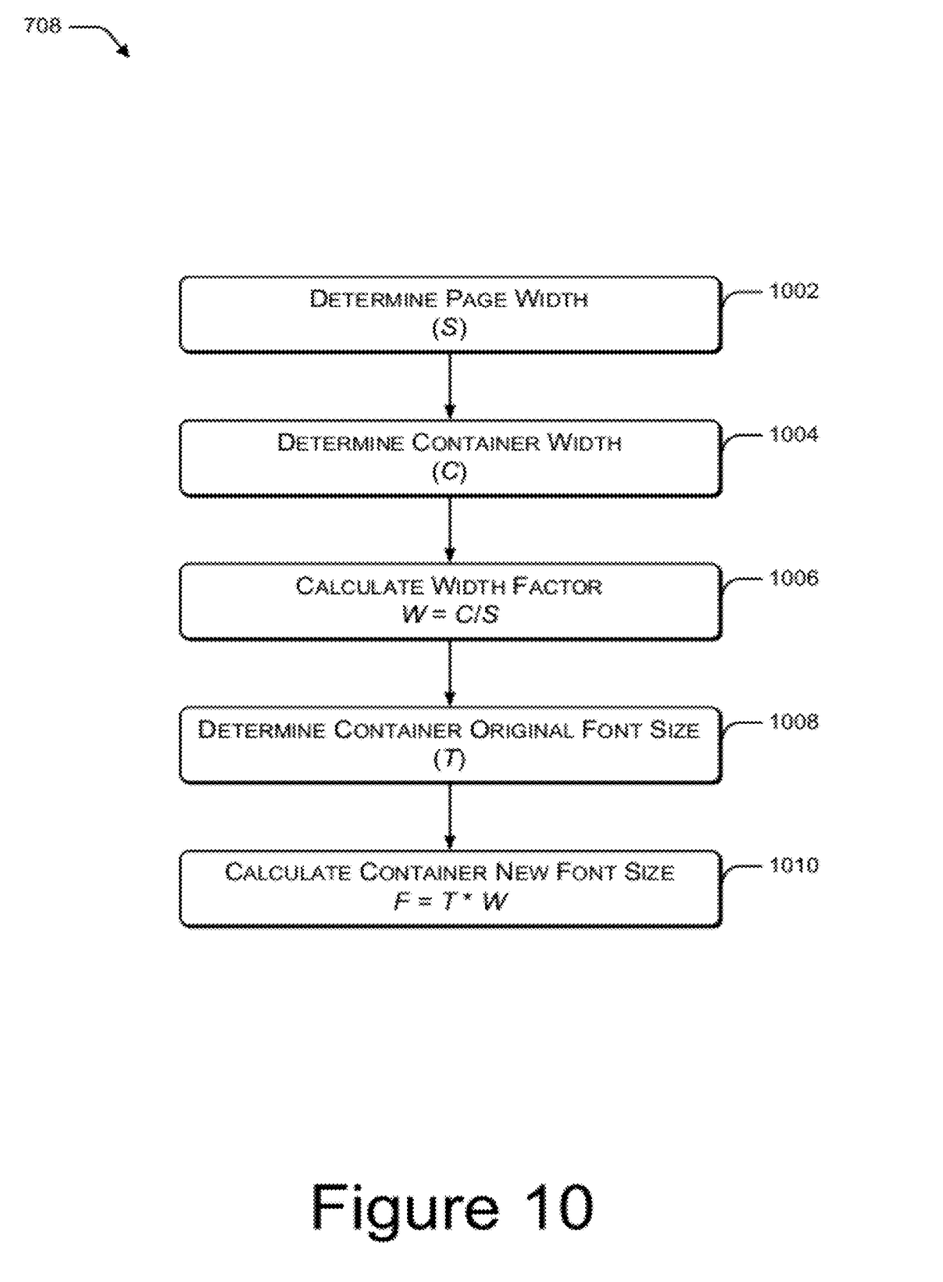
FIG. 10 is a flow diagram that illustrates an example process for proportionally scaling fonts based on a container width.

FIGS. 8-10 illustrate example processes for proportionally scaling web page fonts. FIG. 8 illustrates a process in which fonts are scaled based on both a minimum readable font size and on relative container widths. FIG. 9 illustrates a process in which fonts are scaled based on a minimum readable font size, and FIG. 10 illustrates a process in which fonts are scaled based on relative container widths.

FIG. 8 illustrates an example process 708 for proportionally scaling web page fonts. At block 802, a normalization font size, N, is determined. As an example, font engine 620 of browser application 610 includes functionality that enables a user to select from a variety of font sizes when rendering a particular web page. A particular one of the variety of available font sizes is a pre-defined default, typically labeled "medium." In an example implementation, the normalization font size, N, is selected to be equal to the "medium" font size. In alternate implementations, any other value may be selected for use as a normalization font size.

At block 804, a minimum readable font size, R, is determined. In an example implementation, the minimum readable font size is selected by the user, for example, through a user interface. In an alternate implementation, a minimum readable font size may be predefined for a particular small-screen device, for example, by a device manufacturer or a browser application developer. The minimum readable font size represents a font size that, when rendered on the small-screen display, is reasonably expected to be easy for a user to read. Any number of techniques for determining, configuring, or calculating the minimum readable font size may be implemented.

At block 806, a font factor, X, is calculated as being equal to the ratio of the minimum readable font size to the normalization font size. That is, font scaling module 114 calculates $X = R/N$.

At block 808, a page width, S, is determined. In an example implementation, page width, S, is equal to the width of the display for which the web page was originally designed. The page width may be calculated, for example, by the font scaling module, based on height and position information included in the received web page information.

At block 810, a container width, C, is determined. For example, for each web page element that includes text, layout module 616 determines the width of the web page element according to the received web page content.

At block 812, a width factor, W, is calculated. For example, for each web page element that includes text, layout module 616 calculates width factor, $W = C/S$.

At block 814, the original font size, T, of the text in a particular web page element is determined. For example, layout module 616 analyzes the received web page content to determine a specified font size for a particular web page element.

At block 816, a new font size, F, for the particular web page element is calculated. For example, font scaling module 114 multiplies the original font size by the font factor and the width factor to generate a new font size, $F = T*X*W$.

FIG. 9 illustrates an alternate example process 708 for proportionally scaling web page fonts. At block 902, a normalization font size, N, is determined. As an example, font engine 620 of browser application 610 includes functionality that enables a user to select from a variety of font sizes when rendering a particular web page. A particular one of the variety of available font sizes is a pre-defined default, typically labeled "medium." In an example implementation, the normalization font size, N, is selected to be equal to the "medium" font size. In alternate implementations, any other value may be selected for use as a normalization font size.

At block 904, a minimum readable font size, R, is determined. In an example implementation, the minimum readable font size is selected by the user, for example, through a user interface. In an alternate implementation, a minimum readable font size may be predefined for a particular small-screen device, for example, by a device manufacturer or a browser application developer. The minimum readable font size represents a font size that, when rendered on the small-screen display, is reasonably expected to be easy for a user to read. Any number of techniques for determining, configuring, or calculating the minimum readable font size may be implemented.

At block 906, a font factor, X, is calculated as being equal to the ratio of the minimum readable font size to the normalization font size. That is, font scaling module 114 calculates X=R/N.

At block 908, the original font size, T, of the text in a particular web page element is determined. For example, layout module 616 analyzes the received web page content to determine a specified font size for a particular web page element.

At block 910, a new font size, F, for the particular web page element is calculated. For example, font scaling module 114 multiplies the original font size by the font factor to generate a new font size, F=T*X.

FIG. 10 illustrates another alternate example process 708 for proportionally scaling web page fonts. At block 1002, a page width, S, is determined. In an example implementation, page width, S, is equal to the width of the display for which the web page was originally designed. The page width may be calculated, for example, by the font scaling module, based on height and position information included in the received web page information.

At block 1004, a container width, C, is determined. For example, for each web page element that includes text, layout module 616 determines the width of the web page element according to the received web page content.

At block 1006, a width factor, W, is calculated. For example, for each web page element that includes text, layout module 616 calculates width factor, W=C/S.

At block 1008, the original font size, T, of the text in a particular web page element is determined. For example, layout module 616 analyzes the received web page content to determine a specified font size for a particular web page element.

At block 1010, a new font size, F, for the particular web page element is calculated. For example, font scaling module 114 multiplies the original font size by the width factor to generate a new font size, F=T*W.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
receiving content to be rendered, the content including first and second text containers, the first text container having a first font size and a first container width, the second text container having a second font size and a second container width, wherein the first container width is not equal to the second container width;
defining an original font ratio as a ratio of the first font size to the second font size;
generating scaled content by independently scaling the font size of each of the first and second text containers to generate scaled font sizes, such that a ratio of a first scaled font size associated with the first text container to a second scaled font size associated with the second text container is not equal to the original font ratio; and
rendering the scaled content for display such that:
when the first text container is rendered to fill a width of a display, the first text container has a first displayed font size;
when the second text container is rendered to fill the width of the display, the second text container has a second displayed font size; and
a ratio of the first displayed font size to the second displayed font size is equal to the original font ratio.

2. A method as recited in claim 1, wherein:
the content to be rendered was designed for rendering on a display having a first display width; and
the width of the display is less than the first display width.

3. A method as recited in claim 1, wherein independently scaling the font size of each of the first and second text containers comprises:
determining a minimum readable font size;
determining a normalization font size;
generating the first scaled font size as a function of the first font size, the minimum readable font size, and the normalization font size; and
generating the second scaled font size as a function of the second font size, the minimum readable font size, and the normalization font size.

4. A method as recited in claim 3, wherein determining a minimum readable font size comprises receiving a user selection, through a user interface, of a user-preferred minimum readable font size.

5. A method as recited in claim 3, wherein determining a minimum readable font size comprises identifying a predefined minimum readable font size specific to the display.

6. A method as recited in claim 3, wherein the normalization font size is a preconfigured default font size associated with a web browser application.

7. A method as recited in claim 3, wherein independently scaling the font size of each of the first and second text containers further comprises:
determining a width of the content;
generating the first scaled font size as a function of the first font size, the first container width, and the width of the content; and
generating the second scaled font size as a function of the second font size, the second container width, and the width of the content.

8. A method as recited in claim 1, wherein independently scaling the font size of each of the plurality of distinct text containers comprises:
determining a width of the content;

defining a first width ratio as a ratio of the first container width to the width of the content;

defining a second width ratio as a ratio of the second container width to the width of the content;

generating the first scaled font size as a function of the first font size and the first width ratio; and generating the second scaled font size as a function of the second font size and the second width ratio.

9. One or more computer storage media encoded with computer-executable instructions that, when executed, configure a computer system to perform a method as recited in claim 1.

10. A web browser application at least partially stored in memory and executed on a processor to perform a method as recited in claim 1.

11. A method comprising:

identifying a web page to be rendered;

parsing the web page to identify a plurality of web page elements including a plurality of containers that include text, such that an original font ratio is a ratio of a first font size of text in a first container of the plurality of containers that include text to a second font size of text in a second container of the plurality of containers that include text, wherein a width of the first container is not equal to a width of the second container; and generating a layout for the web page that defines a height and position of each of the plurality of web page elements, wherein generating the layout includes proportionally scaling font sizes associated with each of the plurality of containers that includes text, resulting in scaled font sizes such that a ratio of a first scaled font size of text in the first container to a second scaled font size of text in a second container is not equal to the original font ratio, wherein the font sizes are proportionally scaled based on at least one of:

relative container widths; or a ratio of a minimum readable font size to a normalization font size;

rendering the web page according to the layout;

displaying the first container to have a particular display width, wherein the first scaled font size is adjusted to a first display font size based on a comparison between the width of the first container and the particular display width;

subsequently displaying the second container to have the particular display width, wherein the second scaled font size is adjusted to a second display font size based on a comparison between the width of the second container and the particular display width, wherein a ratio of the first display font size to the second display font size is equal to the original font ratio.

12. A method as recited in claim 11, wherein scaling font sizes based on relative container widths comprises:

identifying a width of the web page;

identifying a first container width for the first container;

identifying a second container width for the second container, the second container width being different from the first container width;

scaling the font size associated with the first container according to a function of the first font size, the first container width, and the width of the web page; and scaling the font size associated with the second container according to a function of the second font size, the second container width, and the width of the web page.

13. A method as recited in claim 11, wherein proportionally scaling font sizes associated with each of the plurality of containers that includes text comprises scaling font sizes based on relative container widths and a minimum readable font size.

14. A web browser application at least partially stored in memory and executed on a processor to perform a method as recited in claim 11.

15. A system comprising:

a processor;

a memory communicatively coupled to the processor; and a browser application at least partially stored in the memory and executable on the processor, the browser application including:

a parser for parsing tagged content to identify content elements;

a layout module for determining a height and a position for each of the content elements;

a font scaling module for generating scaled fonts associated with the content elements by proportionally scaling original fonts associated with the content elements based on relative content element widths, such that:

a proportion between original fonts of first and second content elements having different content element widths is not equal to a proportion between scaled fonts of the first and second content elements; and a proportion between the original fonts of the first and second content elements having different content element widths is equal to a proportion between displayed fonts of the first and second content elements when the first and second content elements having the scaled fonts are rendered to have a common display width; and a renderer for rendering the content elements according to the height and position for each of the content elements as defined by the layout module.

16. A system as recited in claim 15, wherein the fonts are also scaled in proportion to a minimum readable font size.

17. A system as recited in claim 16, wherein the fonts are scaled in proportion to a minimum readable font size using a ratio of the minimum readable font size to a normalization font size.

18. A system as recited in claim 15, wherein the common display width is a small-screen device full display width.

* * * * *